United States Patent
Parolari et al.

(10) Patent No.: US 8,379,530 B2
(45) Date of Patent: Feb. 19, 2013

(54) METHOD FOR INDICATING LOST SEGMENTS

(76) Inventors: Sergio Parolari, Milan (IT); Leonardo Provvedi, Chandlers Ford (GB); Thomas Stockhammer, Bergen (DE)

( * ) Notice: Subject to any disclaimer, the term of this patent is extended or adjusted under 35 U.S.C. 154(b) by 979 days.

(21) Appl. No.: 12/064,238

(22) PCT Filed: Aug. 17, 2006

(86) PCT No.: PCT/EP2006/065410
§ 371 (c)(1),
(2), (4) Date: Apr. 16, 2009

(87) PCT Pub. No.: WO2007/020283
PCT Pub. Date: Feb. 22, 2007

(65) Prior Publication Data
US 2010/0135165 A1    Jun. 3, 2010

(30) Foreign Application Priority Data
Aug. 19, 2005    (EP) .................................... 05425601

(51) Int. Cl.
*G01R 31/08* (2006.01)
(52) U.S. Cl. ..................... 370/252; 370/469; 370/474
(58) Field of Classification Search ................ None
See application file for complete search history.

(56) References Cited

U.S. PATENT DOCUMENTS

| 5,677,918 A | 10/1997 | Tran et al. |
| 6,697,331 B1 | 2/2004 | Riihinen et al. |
| 2002/0146074 A1* | 10/2002 | Ariel et al. ............... 375/240.27 |
| 2007/0076680 A1* | 4/2007 | Amram et al. ............... 370/349 |

OTHER PUBLICATIONS

International Search Report for International Application No. PCT/EP2006/065410; mailed Jan. 22, 2007 (2 pgs.).

\* cited by examiner

*Primary Examiner* — Chirag Shah
*Assistant Examiner* — Jenkey Van

(57) ABSTRACT

An application encoder generates independently accessible symbols and these symbols are aggregated by symbol aggregation means into a packet payload. The aggregated symbols in the packet payload are transported in a defined packet structure. These packets are transported over a channel by a packet transmitter that segments the packets into different segments by segmentation means. A segment receiver included in a first entity has the ability to detect whether a certain segment is lost and also knows the length of the lost segment. The segments are aggregated in the first entity to form at least one packet conforming to the packet stream. A symbol parser entity recovers the symbols and passes the individual symbols to an application decoder. The symbol parser in the second entity recovers, from the recovered non-lost information of each received packet, individual symbols.

14 Claims, 5 Drawing Sheets

METHOD FOR INDICATING LOST SEGMENTS

CROSS-REFERENCE TO RELATED APPLICATIONS

The present Application is a national stage filing under 35 U.S.C. §371 of PCT Patent Application No. PCT/EP2006/065410 titled "Method for Indicating Lost Segments" filed on Aug. 17, 2006 which published under PCT Article 21(2) on Feb. 22, 2007 as WO 2007/020283 in the English language and claims priority under 35 U.S.C. §119 to European Patent Application No. 05425601.1 filed on Aug. 19, 2005, both of which are hereby incorporated by reference in their entireties.

BRIEF DESCRIPTION OF THE FIGURES

The exemplary embodiments are hereinafter described with reference to the accompanying drawings, in which.

Like reference signs refer to corresponding parts and elements throughout the FIGS. 1 to 5.

DETAILED DESCRIPTION OF EXEMPLARY EMBODIMENTS

Many embodiments are directed to ways to make data processing within a transmitting or receiving layer of a protocol layer more efficient. This may be achieved by the features of claim 1. Thus, the indication of a loss or other errors of a segment or a part or parts of it across layer boundaries within a transmitting or receiving layer protocol may be accomplished. As in the case of a detected erroneous segment by e.g. missing sequence numbers or as the CRC (cyclic redundancy check) indicates an erroneous segment, the lower layer of the protocol inserts a well-known sequence of symbols e.g. zeros or is along the erroneous length part of the respective segment, and passes the aggregated packet to the upper layer of the protocol. There, it is possible to extract the incorrect data part of the respective segment as it is indicated by the inserted, predetermined symbol sequence. Thus the remaining part of the respective segment can be used for further processing in the upper layer.

Figure 1:
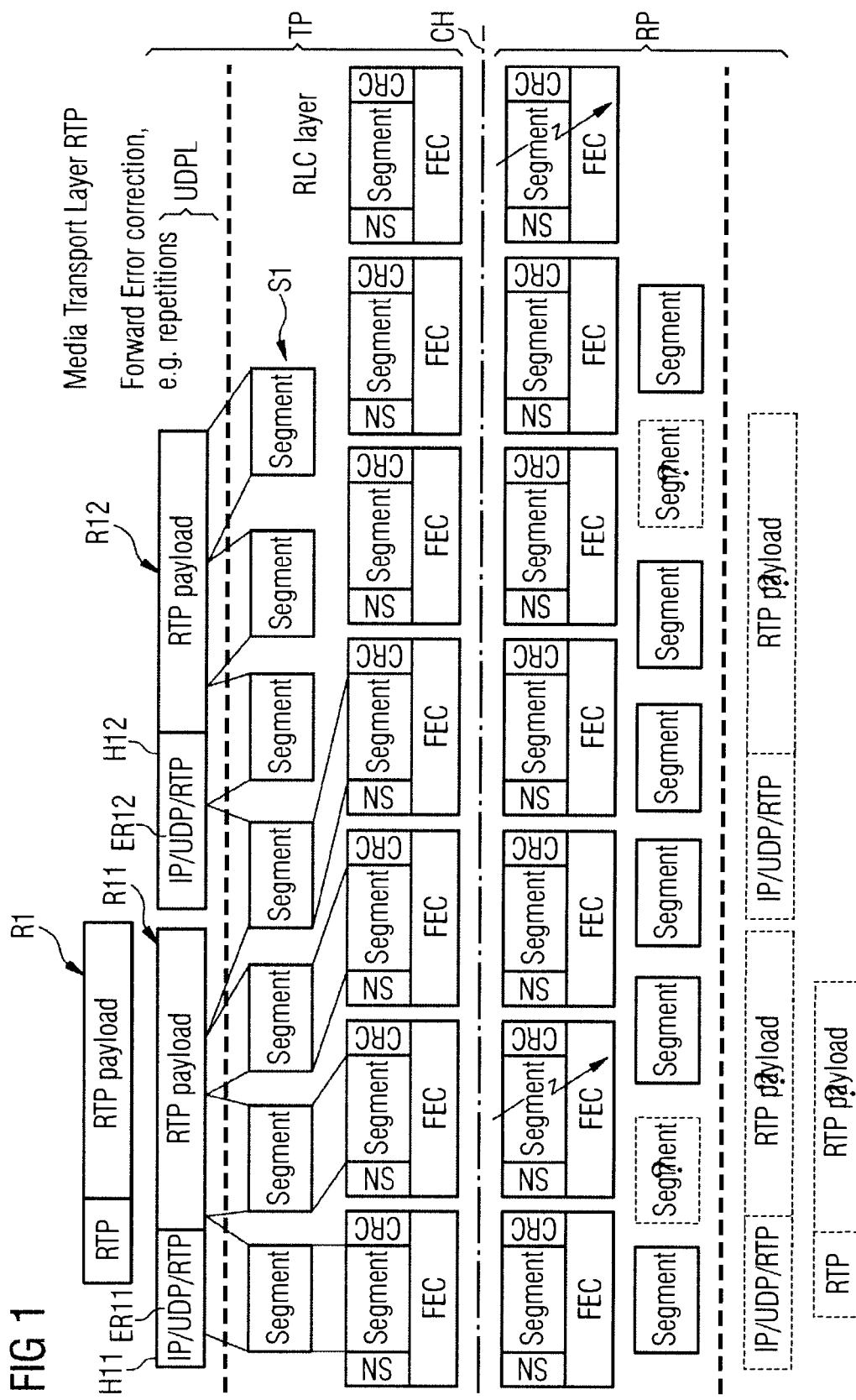
FIG. 1 illustrates a simplified protocol stack within a transmitting entity or receiving entity communicating over at least one channel, FIG. 2 schematically shows an example of a plurality of processing steps executed between an application encoder and an application receiver.

Assume the simplified RTP protocol stack of FIG. 1. In this case multimedia data packetized in a Real-time Transport Protocol (RTP) packet R1 is protected during transport over a noisy channel CH using a simple Forward Error Correction FEC at the transmitter TP on the User Datagram Protocol (UDP) layer UDPL by duplicating the packet R1. Thus two RTP packets R1I, R12 accompanied by forward error correction elements ERI1, ER12 in their respective header field H1I, H12 result. The user datagram Protocol UDP adds for example some kind of a block-check sequence (BCS), e.g. a cyclic redundancy check (CRC), to the entire payload PA1I, PA12 in the header H1I, H12 of each RTP packet R1I, R12. This allows detecting a possible corruption of the payload of the packet R1. Then the packet R1 or its duplicated and error protected packets R1I, R12 is or are transmitted over a radio access network (RAN). In FIG. 1 for simplicity only one radio channel CH of this radio access network is illustrated by a chain dotted line. The protocol stack is in the following simplified. The operations presented namely segmentation and/or adding BCS might happen repeatedly on different layers. For ease of presentation assume that each IP packet is segmented into fixed size segments S1 whereby each segment is in general protected by a sequence number SN, a block-check sequence (BCS), e.g. a cyclic redundancy check CRC and additional FEC, e.g. some convolutional code. Note that the generation of the media packet and the segmentation and transport of the segments might expediently happen at different locations or different functional entities, e.g. processors, which are connected only by defined protocols or primitives exchanged between protocol layers. This is indicated by a bold-dashed line in FIG. 1, respectively. Each of the segments is transmitted over the physical channel CH by burst signals. At a receiver RP it is in general detected if the received data segment included in each received burst is corrupted or lost. This can be accomplished by evaluation of the CRC or the sequence number SN. Different protocols and systems define different actions in case that a certain segment is lost, e.g.

1. The re-assembly is not accomplished and the reassembled packet becoming an IP packet on the upper layer is deleted in the lower layer and not delivered to the upper layer. This might for example be accompanied by an error indication flag.

2. The lost segment on the lower layer is completely ignored and the re-assembling takes such that the correct segments are concatenated without taking into account the lost segment.

3. In some cases data segments can be decoded, but the CRC reports a failure. In this case, the erroneous data bits of segment might be inserted instead of the correct ones. Reassembly takes place as if the segments are all correct . 4. If segment data is not available, dummy bits might be inserted, e.g. all O's. The number of dummy symbols is according to the expected segment length of the lost data.

In all cases the delivered packet is not correct and with very high probability the checksum on the upper layer, e.g. in the UDP layer, on the delivered packet will fail as the data is not correct. In general the UDP layer or any other upper layer will not know what insertion mechanisms for lost segments the underlying, lower layer performs. In this case the UDP layer drops the entire packet as the errors cannot be localized and the correct data cannot be exploited by the upper layer. For example, in this case the media packet is lost. The loss of segments and the discard of the whole RTP packet is indicated by the symbol ? in FIG. 1.

It would be beneficial if the upper layer receives the information that only a small part of the upper layer packet is corrupted. The exact information would for example allow to recover some part of the first packet and some part of the second packet which itself might be sufficient to recover the entire packet. However, the two layers are in general again in different locations or in different functional entities such that the exact information on correct and corrupted packet parts can not be forwarded from the lower layer to the upper layer. One might specify specific new primitives to be exchanged by the entities which allow indicating correct and wrong parts of packets. However, this is in general very difficult as dedicated connections between protocol layers have to be established and the information might be exploited on different levels of the protocol stack. In general it seems difficult to define such a protocol.

Figure 2:
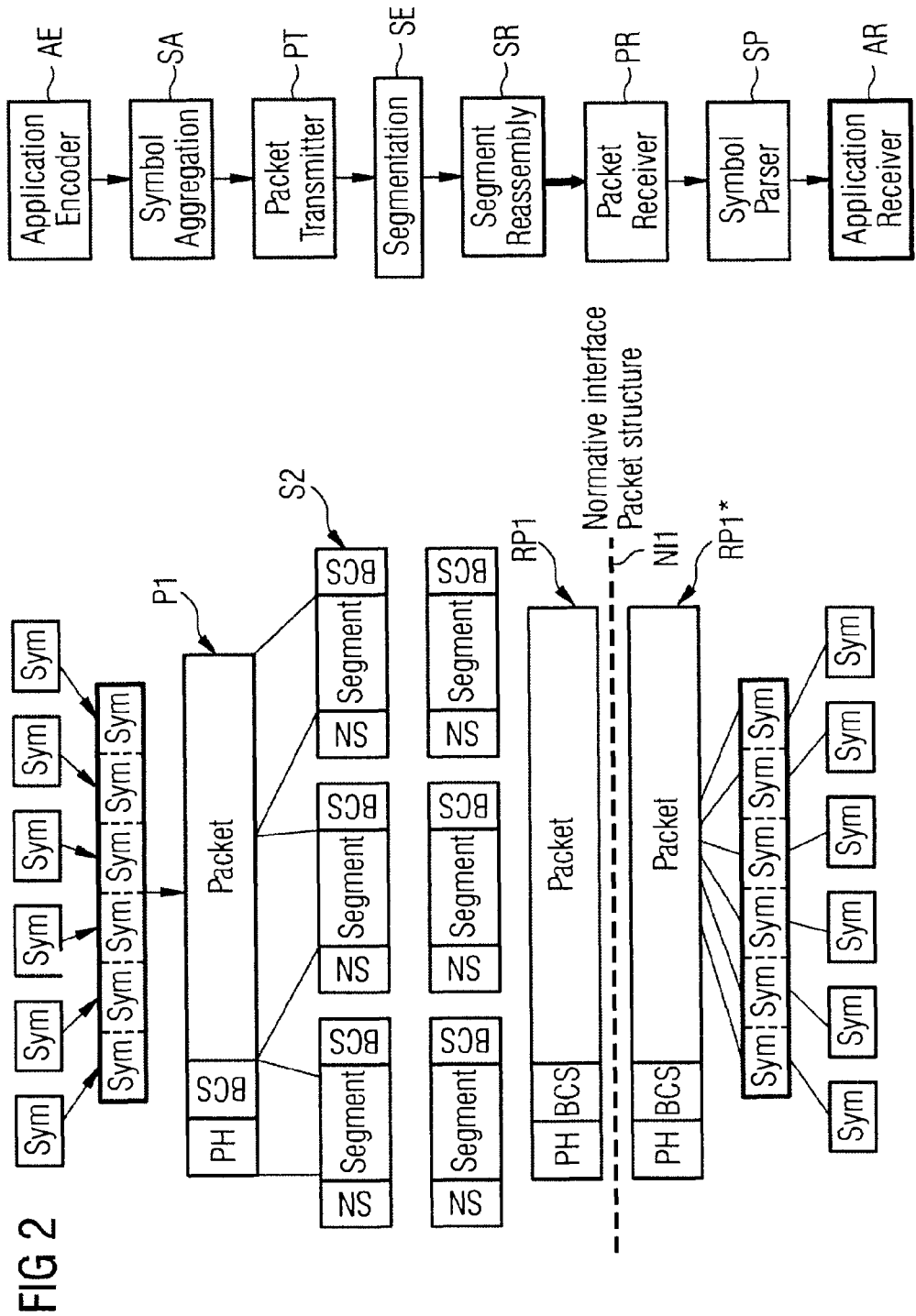

An abstraction of the problem is provided in the following. Details are shown in FIG. 2. Assume that some application encoder AE produces some smaller symbols Sym of equal or variable size. The symbols Sym might be explicitly defined or inherently given by some bitstream or packet syntax. They may be for example encoding symbols of a Raptor encoder. The symbols are aggregated by symbol aggregation means SA such that they form the payload of one packet P1 with a specific syntax having a packet header PH as well as some form of a block check sequence BCS. The position of the BCS is arbitrary. Then this packet P1 is transmitted by packet transmitter means PT over a system SE which segments the packets in smaller segments S2 whereby each segment S2 might contain a sequence number SN as well as some kind of BCS. At some other instance or functional entity the segments are received and in case that all segments are received, the packet RP1 is recovered by reassembling the segments by segment reassembly means SR appropriately. The packet RP1 with a specific structure might then be forwarded through a normative interface Nil defined by the packet structure. The normative interface Nil is indicated by a dotted line in FIG. 2. In some other functional or location entity like a packet receiver PR the received packet RP1* is de-capsulated by a symbol parser SP and the original symbols Sym are recovered and forwarded to the application decoder AR, e.g. a Raptor decoder.

Figure 3:
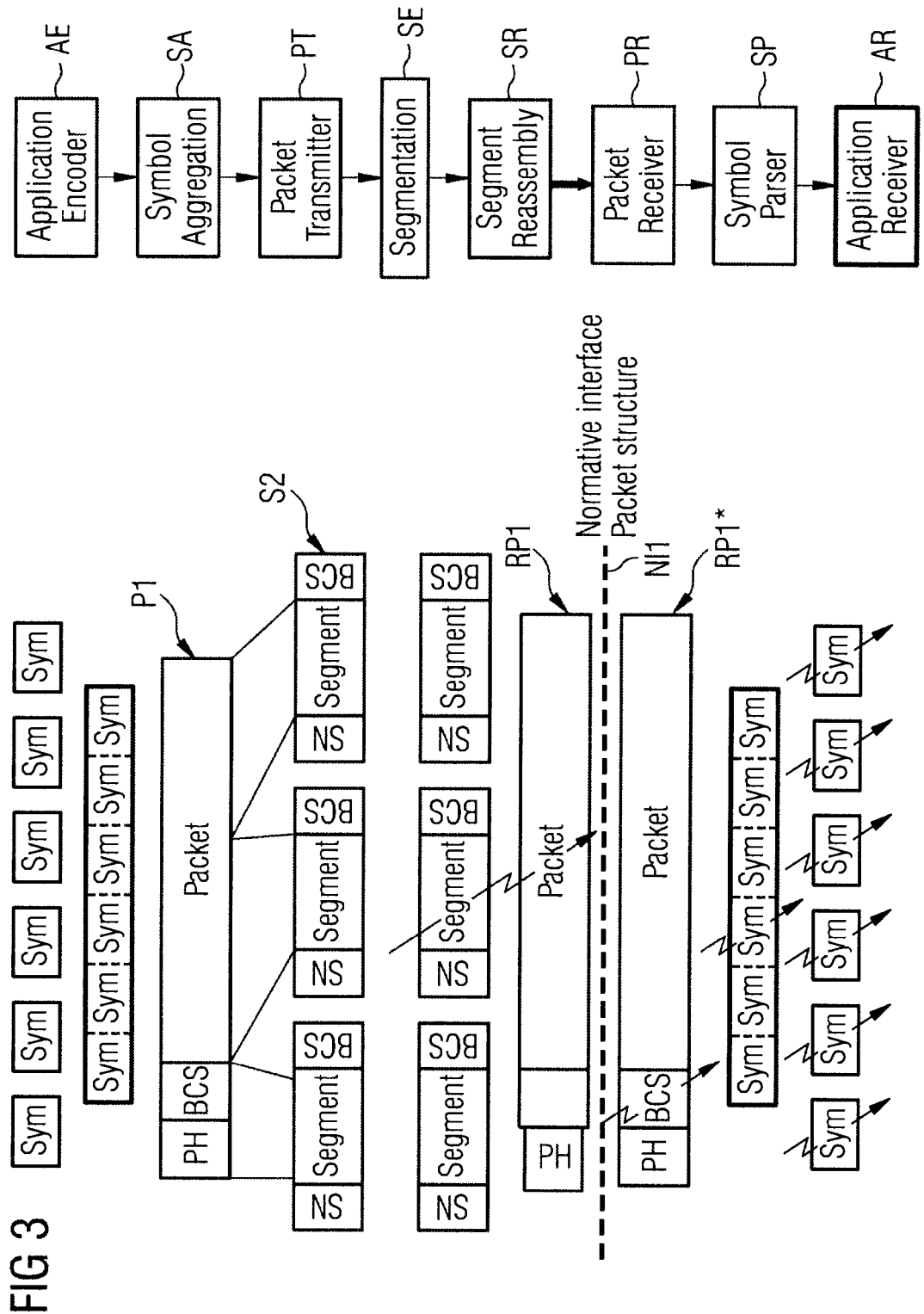
FIG. 3 illustrates the processing scheme of FIG. 2 in the case of a segment loss, FIG. 4 schematically illustrates partly segment recovery according to the exemplary embodiment within the chain of processing steps of FIG. 3, and FIG. 5 as a further embodiment providing a permeable cross-layer error or loss indication from a lower to a higher layer or vice-versa for a wireless system.

FIG. 3 shows the case when a segment loss occurs and the receiver action is arbitrary. In this case the decoder packet reassembling means SR inserts some undefined pattern. By the forwarding of the packet RP1 through the normative interface Nil the action of insertion is not communicated. Therefore, at the other end of this normative interface, the BCS will detect a problem with the packet, but can not locate the problem. Therefore, the entire packet must be assumed as lost and no symbols Sym can be recovered on the receiving side. The loss of symbols Sym is respectively indicated by a flash sign in FIG. 3.

Figure 4:
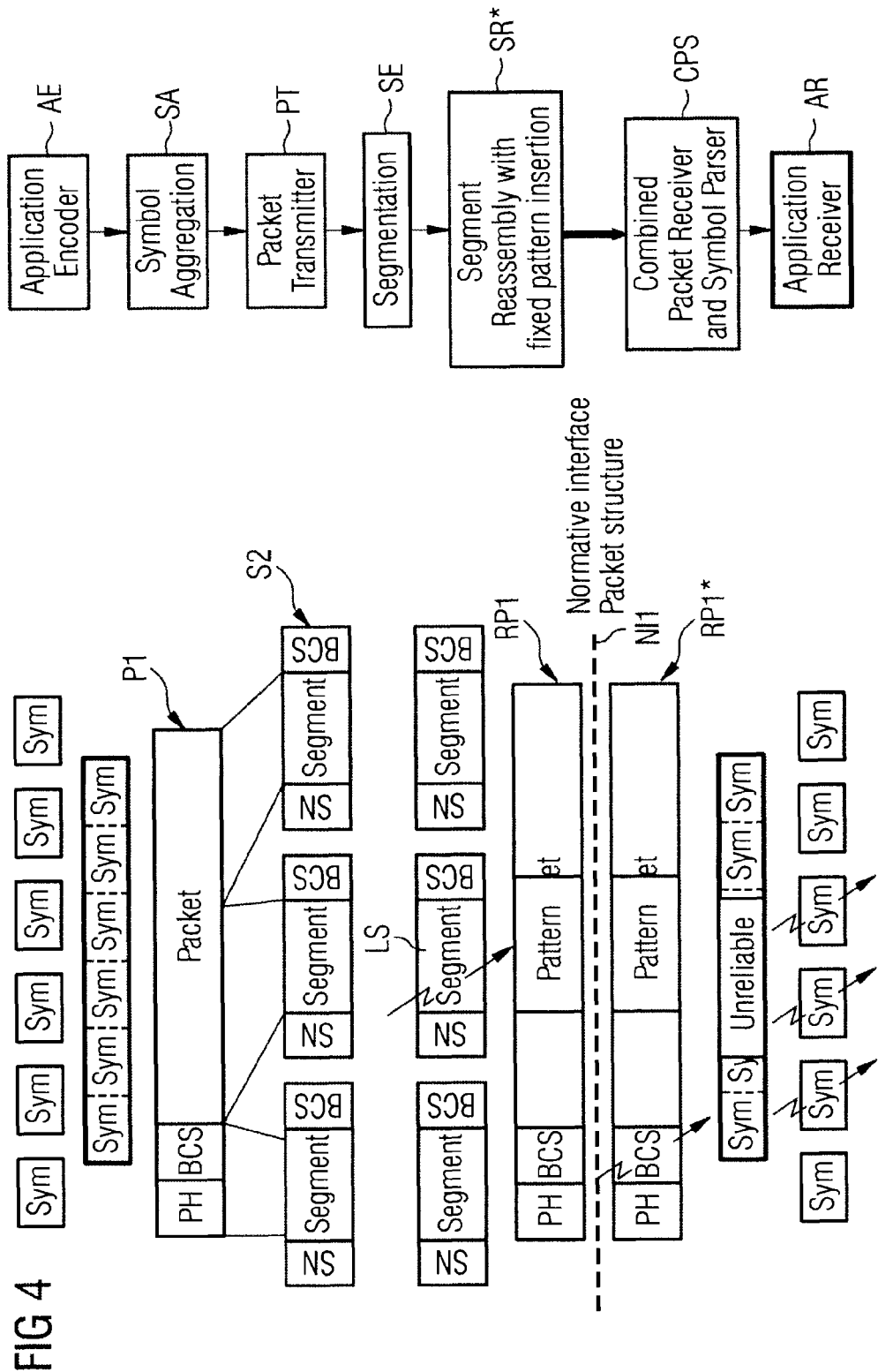

Example Solution:

FIG. 4 shows a solution for the problem. The following steps may be applied advantageously:

1. In the case of a segment loss the segment reassembly is modified such that in any case that a loss of a segment has been detected by a missing SN or a failed BCS on a segment, a fixed pattern, e.g. an all 0 pattern, is inserted with the length of the lost segment. This modified segment reassembly means is denoted by SR* in FIG. 4. Note that the 0s can be bytes or bits depending on the granularity of the interfaces. Assume that an all zero pattern of length N is inserted.

Variations of the pattern or a specific syntax for the pattern to indicate different information are discussed later as a variant of this example.

2. The packet is forwarded through the normative interface Nil and received in some other functional entity, which now processes the pattern.

3. If the BCS in the packet is present then with very high probability the insertion of the pattern will cause the BCS to detect an error in the payload. The BCS will fail.

4. In this case a combined packet receiver and symbol parser CPS searches for a pattern in the received packet RP1* which matches the defined pattern inserted by the lower layer, e.g. a sequence of all N 0s. All 0 positions in the received packet RP1* which are part of an all 0 sequence of at least length N are considered to be not reliable. In addition, all 0 sequences in the beginning of the received packet RP1* as well as all 0 sequences at the end of the packet have to be considered as unreliable. 5. Only the symbols Sym are forwarded to the application layer decoder AR, which are entirely reliable, i.e. they are not part of such an all zero sequence. Therefore, the application layer decoder AR can recover additional symbols Sym.

Variants and Extensions of the Discussed Example

Some favorable variants and supplements are discussed in the following:

Variants on patterns:

Instead of using only the all 0 bit or byte pattern with the length indicating the lost amount symbols in the packet, the following variants could be considered advantageously:

1. A random bit sequence might be used if it is clear that for example all zero sequences occur in the regular more often than the statistics might suggest.

More than one sequence might for example be used in some variants.

2. The lower layer knows the position and algorithm of the checksum of the upper layer packet. In this case it might check whether one of the sequences causes the problem that the upper checksum would be correct if inserted. This could very likely be avoided by different sequences as it likely that not all patterns cause problems . 3. Different sequences could allow to signal additional information to the upper layer, e.g. one could imagine to signal the reliability of the length information by e.g. using an all 0 pattern for a lost segment if it is very sure that the length of the segment is correct or an all one sequence indicates some uncertainty on the size of the lost segment.

4. A synchronization marker with some defined syntax including the length information or possible other additional information could be added instead of a pattern of fixed length. In this case the combined packet receiver and symbol parser would look for the synchronization pattern and interpret the following information to determine the information on the length of the loss. The synchronization marker should be such that it is very unlikely that it is emulated in the data.

Variants if BCS on Packet-Level is not Present:

If the BCS on the packet level is not present, all actions on the layer where the interpretation of the packet is done would be done unconditionally and in any case. Basically all patterns can be used as discussed previously. However, in this case data emulation will cause significant problems. Without the presence of BCS in the upper layer only very unlikely patterns should be used and preferably the aforesaid option 4 on the patterns is the only feasible way.

Multiple Layer Information Exchange:

The process as shown in the example for just one layer information exchange can be generalized to the exchange of this information over several layers. For example, an intermediate layer could act as a combined packet receiver and symbol parser whereby the symbol size in this case might be as small as one bit or one byte. In addition, the same layer would act as a segment-reassembling and would insert the same pattern or any another pattern as discussed previously. Then the packet can be forwarded to the upper layer.

The interaction between different protocol layers is usually limited in a sense that only very few primitives and data in terms of PDU (Protocol Data Units) and SDU (Service Data Units) can be exchanged. Primitives are in general syntactically and semantically very limited. Additional data exchange without using one of these defined interfaces is in general infeasible as different layers of the protocol stack might not be at the same location or they might be implemented in different software or hardware modules. This is for example the case in wireless communication systems or in mobile terminals. Therefore, the exchange of additional information is basically infeasible for many cases.

Figure 5:
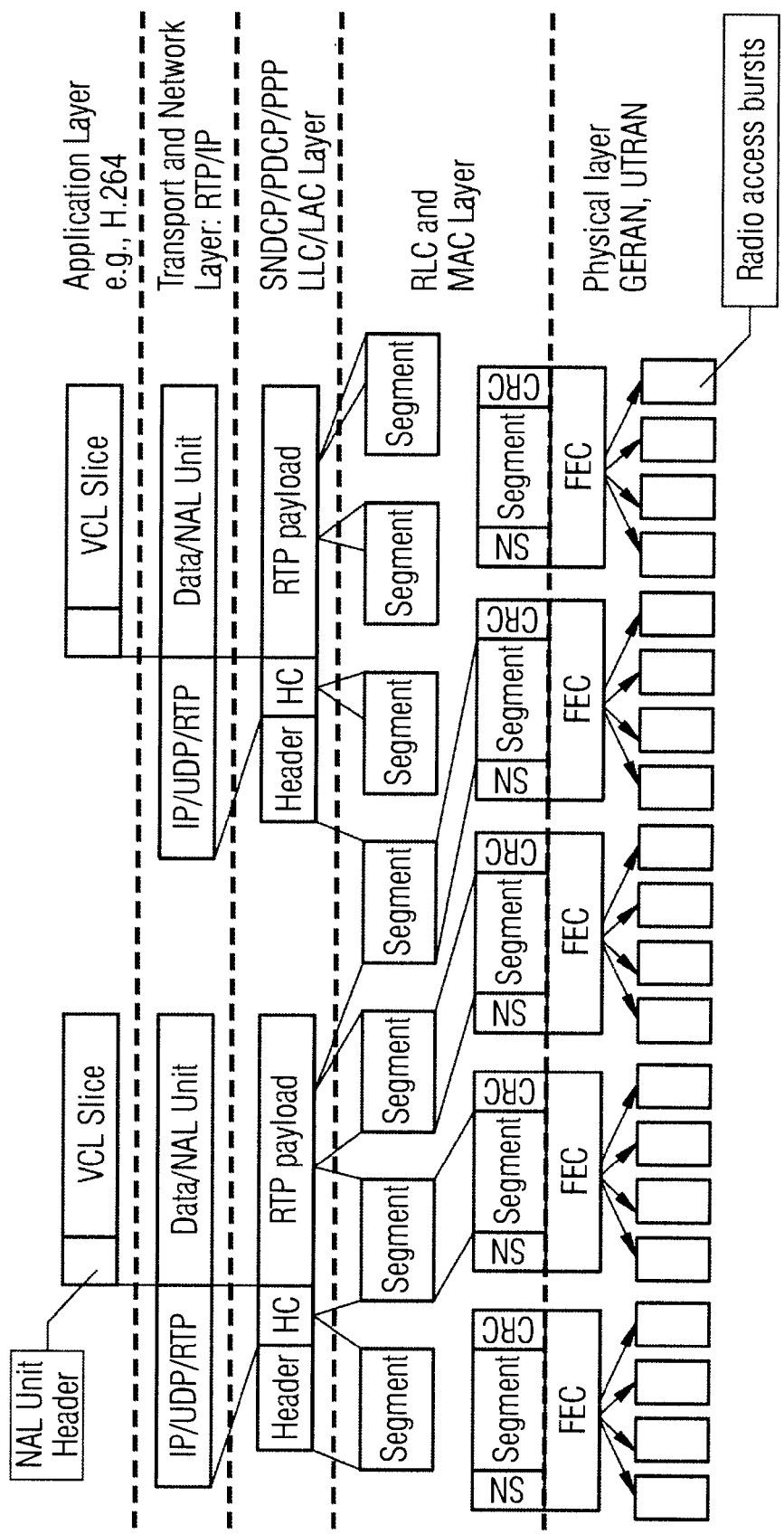

In the following we will present an example in FIG. 5 for which in a wireless system some crosslayer error indication should be exchanged. However, this example is not limited to the case presented but the idea can basically be applied in any other scenario as well.

Assume the typical scenario in a wireless system where the upper layer, e.g. the SNDCP layer, delivers an SDU to the lower layer, e.g. the RLC layer. In this case the RLC-SDU is in general of variable length and any packet size, usually bounded by some maximum packet size, might be delivered to the lower layer. However, radio systems usually only provide a limited amount of RLC-PDU sizes and the RLC-PDU size is usually predetermined by the radio layer due to some radio resource optimizations. Therefore, the variable size RLC-SDU might be segmented and transported over several RLC-PDUs whereby each RLC-PDU gets assigned some block check sequence, e.g. some cyclic-redundancy check (CRC), and possibly some FEC is applied. The RLC-SDU might also be protected by a block check sequence, e.g. a CRC, or it might contain a packet, e.g. an IP/UDP packet, which itself is protected by a block check sequence. It might also contain a segments or parts of a packet which are protected by a block-check sequence on higher layers.

Assume now at the receiver that the RLC layer detects that a segment could not be decoded. This is for example detected as the block-check sequence fails or by detecting that the sequence numbers are not correct. In general, the receiver knows the length of the lost segment and its position by evaluating appropriate header information, sequence numbering, and/or by some information from correctly decoded segments. The latter information might not be reliable in some cases. The RLC layer is now supposed to deliver an entire RLC-SDU to the upper layer. If all RLC-PDUs are correctly received, the RLC-SDU can be aggregated and delivered to the upper layer. The checksums on the upper layers will be correct unless no additional errors on the transmission on the respective layer have occured. In case that any RLC-PDU is detected to be lost or corrupted, the action for reassembly is not clear. The following actions might for example occur:

1. The entire RLC-SDU is deleted in the respective layer and not delivered to the upper layer. This might for example be accompanied by an error indication flag.

2. The lost RLC-PDU is completely ignored and the RLC-SDU is concatenated without taking into account the lost RLC-PDU. 3. If some decoded data is available, but only the CRC failed, the erroneous data bits can inserted instead of the correct ones.

4. If the data is not available, some dummy data can be inserted, e.g. all O's. The length depends on the expected RLC-PDU length of the lost data.

No standardized means is applied in nowadays networks. For example, for GPRS some procedure along the line of precedent item 4 is applied, whereas EGPRS uses technology similar to item 3. Other networks might use other technologies. In general no additional information is passed from the lower layer to the upper layer except for the data. In some cases, some error indication might be assigned to a wrong RLC-SDU, but this in general detected with very high probability by any block-check sequence in the upper layers.

However, with this procedure, some important information is lost, namely that only a segment of the RLC-SDU is corrupted and that this corrupted segment is detected and the boundaries are exactly known. The information that only a small segment is lost might be very beneficial for some applications, e.g.

The correct initial part of a packet might be used by some application layer decoder, e.g. some video decoder.—All correct parts of the packet might be used by an erasure-based application layer FEC decoder.

This information is in general lost on the layer boundaries as the communication is limited.

Up to now this problem has been solved either that the entire RLC-SDU or the SDUs on the higher layers are completely lost. Therefore a huge amount of correctly received data is not accessible for higher layers. Another solution when passing the erroneous payloads to the upper layers must rely on that the application layer can cope with bit errors without having any clue were the bit-erroneous part is. For example, some video coding standards such as MPEG-4 include special means for this purpose. However, in general this method is not applied as the video encoder must include means to cope with these issues which are in general less compression efficient. In addition, if these errors are not appropriately located, annoying artefacts would occur. In case of application layer coding the decoder would have to be changed to not only cope with erasures, but also with possible errors. This would significantly increase the complexity of the decoder or it would also lead to decreased efficiency.

It is proposed to solve the limitations of the protocol stack interaction to convey the information by the following favourable means. In case of a detected erroneous segment by e.g. missing sequence numbers or as the CRC indicates an erroneous segment, the lower layer inserts a well-known sequence of the correct length in the data block, e.g. a sequence of all Os., and passes the aggregated packet to the upper layer. The upper layer at some point whenever it detects the presence of such a sequence in the packet, it assumes that all data in this area which spans this sequence, is lost. If random data is assumed and the RLC-PDU is in the range of at least a few bytes, the probability that a sequence of real data occurs is very unlikely. In addition, to check whether this part is inserted by the lower protocol stack or is intentional data can also be checked by some block-check sequence, e.g. UDP checksum, on the upper layer. Therefore, the incorrect data part of the RLC-SDU can be extracted. Note that the boundaries might be not exact such that more data is lost, but in case of random data, the additional losses should also be marginal and they are for sure not more than would happen in the case where the entire RLC-PDU is dropped. The lower layer might also decide not to just use one sequence in the data to indicate some properties, but more sequences. More favourable sequences could for example be used for the following purposes:

If the lower layer knows the position and algorithm of the checksum of the upper layer, it might check whether one of the sequences causes the problem that the upper checksum would be correct if inserted. This could be avoided by different sequences.

Different sequences could allow to signal additional information to the upper layer, e.g. one could imagine to signal the reliability of the length information by e.g. using an all 0 sequence for a lost RLC-PDU if it is very sure that the length of the RLC-SDU is correct or an all one sequence to indicate some uncertainty on the size of the lost RLC-PDU.

Even longer sequences could be used with a long synchronization marker, e.g. 50 all 0 bytes followed by a one byte followed by some correct syntax and semantic field, e.g. 2 byte field indicating the length of the lost data, 2 byte on the reliability, etc. Any kind of information could be signalled.

If the application layer is aware of and can rely on the syntax on the underlying protocol layer, it can extract additional information from the received SDU, possibly coupled only to the case when some integrity checksum on the upper layer fails. This might allow recovering correct parts as well as erased parts. This information is up to now not possible to be conveyed from lower layers to upper layers without specifying new primitives. Still, each layer can decide to apply standard procedures to non-correct SDUs and just drop them, e.g. if some relevant header information is assumed to be not correct.

The invention claimed is:

1. A method for processing data comprising lost or defective segments at a communications receiver, the method comprising:
   receiving a plurality of segments of data at a segment receiver of a first entity;
   making a determination that a segment is lost or defective at the segment receiver;
   aggregating the plurality of segments to form at least one aggregated packet at the first entity;
   inserting a predetermined pattern at a position in the at least one aggregated packet where the lost or defective segment would be, the predetermined pattern indicating the lost or defective segment, using the segment receiver of the first entity, wherein inserting the predetermined pattern includes inserting a length of the lost or defective segment and a code indicative of a reliability of the inserted length as the predetermined pattern;
   transmitting the at least one aggregated packet to a packet receiver of a second entity;
   searching for the inserted predetermined pattern in the at least one aggregated packet;
   interpreting each found pattern to recover non-lost or non-defective information within the at least one aggregated packet;
   recovering, from the non-lost or non-defective information within the at least one aggregated packet, individual symbols using a symbol parser; and
   passing the individual symbols to an application decoder.

2. The method of claim 1, further comprising, at a communications transmitter:
   generating independently accessible symbols using an application encoder;
   aggregating the independently accessible symbols using a symbol aggregator into packets having a packet structure defined by any one of at least one packet header, a block-check sequence, or a payload of variable length of the aggregated independently accessible symbols;
   segmenting the packets into different segments by a packet segmenter; and
   transporting the segments over a channel by a packet transmitter.

3. The method of claim 1, further comprising passing the at least one aggregated packet from the first entity to the second entity across a normalized interface, wherein the normalized interface is configured to pass the at least one aggregated packet according to a specified format.

4. The method of claim 1, wherein the first entity is a lower protocol layer and the second entity is an upper protocol layer.

5. A communications receiver for processing data comprising lost or defective segments, the communications receiver comprising:
   a segment receiver configured to receive a plurality of segments of data and to detect whether a segment is lost or defective;
   a segment reassembler configured to aggregate the segments to form an aggregated packet and to insert a predetermined pattern at a position in the aggregated packet where the lost or defective segment is detected, the segment reassembler being configured to insert a length of a lost or defective segment and a code indicative of a reliability of the inserted length as the predetermined pattern; and
   a symbol parser configured to search for the predetermined pattern in the aggregated packet, to parse symbols considered to be reliable from the aggregated packet, and to forward the symbols to an application layer decoder.

6. The communications receiver of claim 5, wherein the segment receiver is configured to detect whether a segment is lost or defective by detecting a missing sequence number.

7. The communications receiver of claim 5, wherein the segment receiver is configured to detect whether a segment is lost or defective by detecting a failed block check sequence.

8. The communications receiver of claim 5, wherein the segment receiver is configured to detect whether the segment is lost or defective at a first protocol layer and the symbol parser is configured to search for the predetermined pattern in the aggregated packet at a second protocol layer higher than the first protocol layer.

9. The communications receiver of claim 8, wherein the first protocol layer is a Sub-Network Dependent Convergence Protocol (SNDCP) layer.

10. The communications receiver of claim 5, wherein the segment receiver is configured to receive segments of data in a general packet radio service (GPRS) format.

11. A method of processing data comprising lost or defective segments in a communications receiver, the method comprising:
    receiving a plurality of segments of data;
    making a determination that a segment is lost or defective;
    aggregating the plurality of segments to form an aggregated packet;
    inserting a predetermined pattern in the aggregated packet indicating the lost or defective segment, wherein inserting the predetermined pattern includes inserting a length of the lost or defective segment and a code indicative of a reliability of the inserted length as the predetermined pattern;
    searching for the inserted predetermined pattern in the aggregated packet;
    identifying data which is not lost or defective in the aggregated packet; and
    forwarding the identified data to an application layer program.

12. The method of claim 11, wherein each of the plurality of segments has a sequence number, and wherein making a determination that the segment is lost or defective comprises detecting a missing sequence number.

13. The method of claim 11, wherein the predetermined pattern is inserted at a first protocol layer and the inserted predetermined pattern is searched at a second protocol layer higher than the first protocol layer.

14. The method of claim 11, wherein the receiving comprises receiving segments of data in a general packet radio service (GPRS) format.

* * * * *